Sept. 22, 1970 T. E. OSBORNE 3,530,440
DATA PROCESSING SYSTEM INCLUDING CONTROLLABLE MEANS FOR DIRECTLY INTERCONNECTING THE INPUT AND OUTPUT UNITS
Filed Aug. 26, 1968
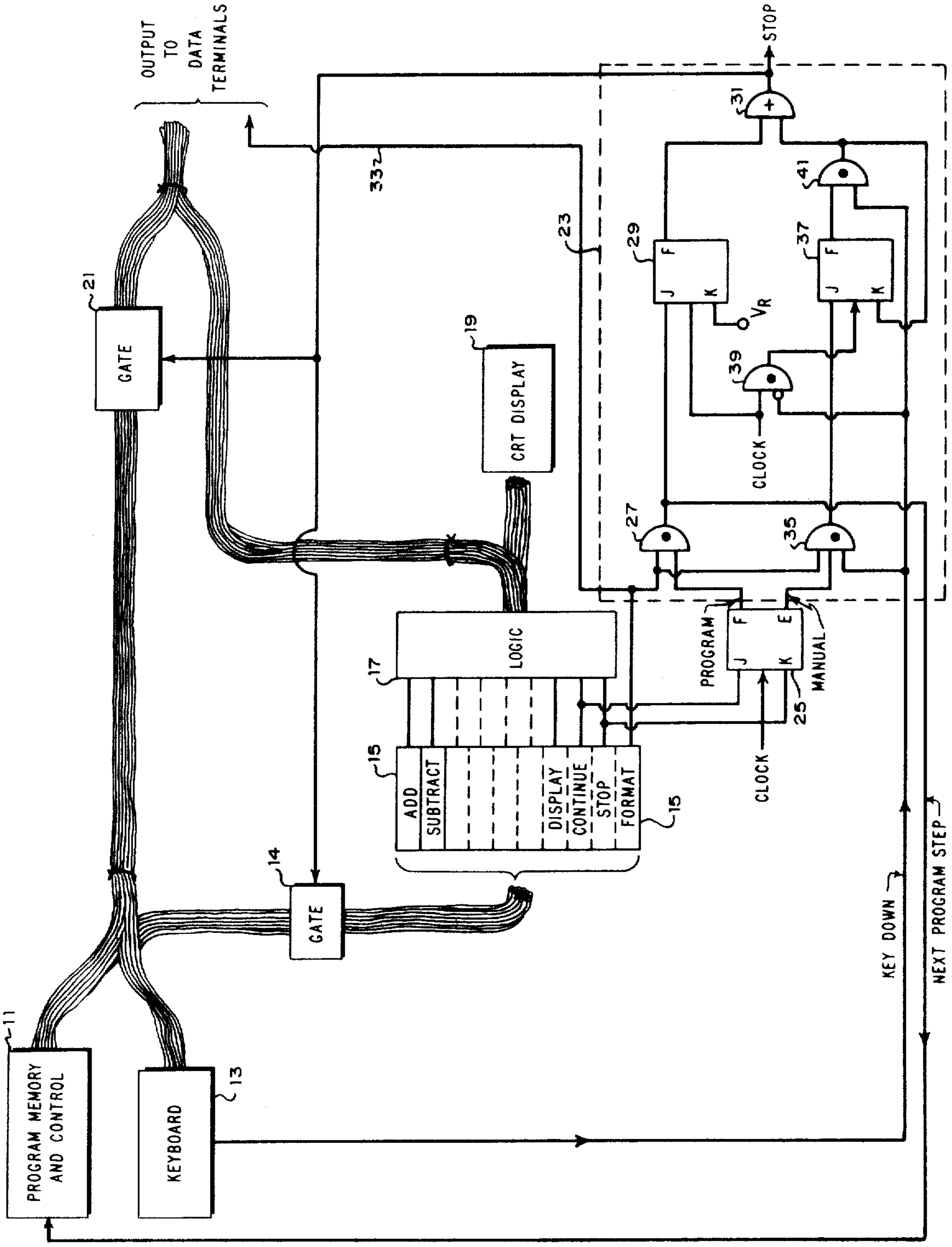
INVENTOR
THOMAS E. OSBORNE
BY Stephen P. Fox
AGENT United States Patent Office 3,530,440
Patented Sept. 22, 1970

3,530,440

DATA PROCESSING SYSTEM INCLUDING CONTROLLABLE MEANS FOR DIRECTLY INTERCONNECTING THE INPUT AND OUTPUT UNITS

Thomas E. Osborne, San Francisco, Calif., assignor to Hewlett-Packard Company, Palo Alto, Calif., a corporation of California Filed Aug. 26, 1968, Ser. No. 755,127
Int. Cl. G06f *3/00*
U.S. Cl. 340—172.5 3 Claims

ABSTRACT OF THE DISCLOSURE

A data processing system includes a bypass gate and control circuitry therefor which permits external data terminals to receive and distinguish function control signals transmitted directly from a program memory unit or a keyboard. The bypass gate is connected in series between the input and output units and is enabled by the control circuitry after a format selection code is received from either the program memory or the keyboard. Only the input signal next succeeding the format code is transmitted directly to the data terminals.

BACKGROUND OF THE INVENTION

A typical basic computing system includes a processing unit and one or more input and output devices. The input devices may be a keyboard and/or a program memory unit for entering data into the processing unit. The output devices may include printers, cathode ray tube display units or a variety of other data terminal components. Generally data and processing instructions from the input devices are entered into the logic circuitry of the processing unit and the processed data is then transmitted to the output devices. However, it is desirable to be able to control the various functions of an output device such as a printer directly from an input device instead of from the processing unit. In this instance signals from a keyboard or program memory unit should not be merely printed, for example, but should be interpreted as special function control signals. It is preferable that the transition from a data processing mode to a function control mode be made in response to appropriate signals generated by the input device. Problems arise in the case where the circuitry must respond to signals generated either by manual operation of a keyboard or by automatic execution of a program.

SUMMARY OF THE INVENTION

In accomplishing the aforementioned desirable purposes, the present invention, in one embodiment, comprises a system utilizable in an electronic calculating machine and in which signals from either a keyboard or a program memory and control unit may be gated directly to one or more remote data terminals, thereby permitting certain instructions to bypass the central data processing unit. The bypass gate is controlled by circuitry responsive to a detected format selection code which is generated either manually by depression of a key, or automatically during execution of a program. The logic circuitry is capable of distinguishing between manually and automatically generated format selection codes. If a manually generated format code is recognized, the bypass gate is enabled to transmit only the next key code signal from the keyboard, and if format code from the program memory is recognized, the bypass gate is enabled only for the duration of the immediately succeeding program step. Also, the control circuitry, in response to a format selection code, produces a conditioning signal to prepare the remote data terminals for a function control signal forthcoming directly from the input devices. Thus the data signals normally transmitted to the data terminals from the processing unit may be interrupted with special function control signals from the input devices by merely keying or programming a format code.

BRIEF DESCRIPTION OF THE DRAWING

The single figure is a block diagram of the preferred embodiment of the present invention.

DESCRIPTION OF THE PREFERRED EMBODIMENT

Referring now to the figure, there is shown a computing system including two input devices, namely a programmable memory and control unit 11 and a keyboard unit 13, each of which generates multi-level code signals representing data and processing instructions. These code signals are applied through a gate 14 to a central processing unit including decoding circuitry which is responsive to a plurality of input codes to initiate different subroutines. These subroutines are stored in memory in the central processor and are represented by the blocks 15. Data signals are suitably processed in accordance with the selected subroutines by the central processing logic circuitry 17 and selected output information is displayed by a cathode ray tube display device 19. The output from the logic circuitry 17 is also directed to external data terminals, not shown, which may include, for example, an alphanumeric printer or an XY recorder.

Generally, data and instructions derived from the program memory 11 or entered from the keyboard 13 are processed, and the results are displayed by the CRT device 19. However, it is important to note that the functions of the data terminals may be controlled directly from the input devices. For this purpose, there is provided a bypass gate 21 which receives code signals directly from the program memory 11 or keyboard 13 and transmits them to the data terminals. The bypass gate 21 is enabled by logic circuitry 23, described hereinafter.

The overall system is operable either in an automatic program execution mode in response to sequential program steps from the program memory 11, or in a manual-display mode by operation of the keyboard 13. The automatic and manual-display modes of operation are initiated upon receipt of "continue" and "stop" input codes, respectively. As indicated by connections to the correspondingly labelled blocks 15, these codes produce signals which drive a J–K flip-flop 25. This flip-flop is synchronized with the system clock and has a pair of complementary F and E outputs. When a "continue" code is detected, the J input of flip-flop 25 is pulsed and the F output thereof is set to "1" on the next clock pulse to indicate that the system is in the automatic program execution mode. The system stays in this mode until detection of a "stop" code, which pulses the K input to cause flip-flop 25 to be reset on the next clock pulse, thus indicating that the system is in the manual-display mode.

Additional detecting circuitry, not shown, samples the outputs of flip-flop 25 at the end of each sequential routine performed by logic 17 to determine whether the system is in the program or manual-display mode. If the program mode is detected, the next program step is initiated from the program memory 11 and if the manual-display mode is detected, the system is driven into a display routine, whereby selected information from the logic circuitry 17 is fed to the CRT display 19 until an input signal is received from the keyboard 13.

The logic circuit 23 controls gates 14 and 21 after detection of a "format" input code, which is represented by one of the blocks 15. This circuit operates in two different ways, depending on whether the system is in the automatic program execution mode or in the manual-display mode. Specifically, when the system is in the program mode and a "format" code from the program memory 11 is detected, an AND gate 27 is enabled and the output thereof interrogates the program memory so that the next program step is produced in synchronism with the next clock pulse. The output from AND gate 27 is also connected to the J input of a J–K flip-flop 29 which is clocked in synchronism with the program memory. The F output of flip-flop 29 is set to "1" on the next clock cycle after an output is received from AND gate 27. The format code signal detected is one clock cycle in duration and therefore the F output is reset to "0" one clock cycle after it is set, due to the reference voltage $V_R$ applied to the K input. The F output signal of flip-flop 29 is a pulse one cycle in duration and delayed one program step after detection of a "format" code. This pulse is coupled through an OR gate 31 to the inhibiting input of gate 14 and the enabling input of bypass gate 21. Inhibit gate 14 then blocks data signals from the central processing unit, and gate 21 simultaneously conducts to connect the external data terminals directly to the program memory only during the one cycle program step which next follows a "format" code. It is the code signal of this next program step which is used to control a predetermined function of one or more of the data terminals.

There is provided an output line 33 from the "format" code block 15 to the data terminals for the purpose of conditioning the data terminals so that data signals may be distinguished from function control signals. The line 33 carries an output pulse which immediately precedes transmission of a function control signal from the program memory.

The system may be switched to the manual-display mode of operation after a function control signal is transmitted by the program memory unit 11. This is achieved by connecting the "stop" output from OR gate 31, to the K input of the J–K flip-flop 25.

The circuit 23 also operates to control inhibit gate 14 and bypass gate 21 when the system is in the manual-display mode. Specifically, when a "format" key of the keyboard is depressed and the resulting "format" code generated thereby is detected, an AND gate 35 is enabled. The output of AND gate 35 conditions a J–K flip-flop 37, however, the clock signal thereto is inhibited by a gate 39 as long as the key on the keyboard 13 remains down. This is achieved by a signal on the line designated "key down" in the drawing. Therefore, flip-flop 37 will not be set until the key is released. Once the key is released, this flip-flop is set in synchronism with the next clock pulse to produce a continuous "1" signal at its F output and thereby to hold in memory the fact that a "format" key was operated. Thereafter, when any other key is depressed, an AND gate 41 is enabled and the output thereof is coupled through the OR gate 31 to the inputs of gates 14 and 21. The output of AND gate 41 is also connected to the K input of flip-flop 37 to reset this flip-flop on the clock signal next following the release of a key. As a result, the inhibit gate 14 and the bypass gate 21 are enabled for only one clock cycle to transmit only to the data terminals a function control code which corresponds to the particular key depressed. As in the case of operation in the program mode described hereinabove, the data terminals are conditioned to receive the function control code by a preceding pulse on line 33.

I claim:

1. In a data system including a central processing unit, an apparatus for transmitting selected function control signals to at least one data terminal comprising:

- means for generating data signals including:
  - program memory means operable in an automatic execution mode to produce sequential program steps; and
  - keyboard means operable in a manual mode;
    - said program memory means and said keyboard means each being operable to produce a format selection code and function control signals;
- means for bypassing said central processing unit to gate said data signals from said generating means directly to an output connectable to said data terminal, said bypass means having an enabling input;
- means responsive to the data signals from said generating means for detecting said format selection code, said detecting means having an output for conditioning said data terminal to receive said data signals directly from said generating means;
- means for selecting one of said automatic program execution mode and said manual mode of operation of said data signal generating means;
- logic means responsive to said detecting means and said selecting means for controlling said bypass means to gate said data signals from said generating means to said data terminal, said logic means including:
  - first means operable in said automatic program execution mode for enabling said bypass means to transmit only the next succeeding signal from said program means after a format selection code is detected by said detecting means; and
  - second means operable in said manual mode for enabling said bypass means to transmit only the next succeeding signal from said keyboard means after a format selection code is detected by said detecting means.

2. The function control signal transmitting apparatus of claim 1, said first means for enabling said bypass means including:

- coincidence gating means responsive in said automatic program execution mode for producing an output when a format selection code is detected by said detecting means;
- means responsive to the output of said coincidence gating means for sequencing said program memory means to the signal code of the next program step following said format selection code;
- delay means responsive to the output of said coincidence gating means for producing an output signal in synchronism with said next program step; and
- means connecting the output of said delay means to the enabling input of said bypass means.

3. The function control signal transmitting apparatus of claim 1,

- said keyboard means having a format key for producing a format selection code;
- said second means for enabling said bypass means including:
  - coincidence gating means responsive in said manual mode for producing an output when said format key is operated and when the format selection code generated thereby is detected by said detecting means;
  - means for temporarily holding in memory the output from said coincidence gating means after said format selection key is operated;
  - gating means responsive to said temporary holding means for producing an output when a key of said keyboard means is operated after said format key is operated; and means connecting the output of said last named gating means to the enabling input of said bypass means.

References Cited

UNITED STATES PATENTS

| | | | |
|---|---|---|---|
| 3,047,228 | 7/1962 | Bauer et al. | 340—172.5 X |
| 3,289,176 | 11/1966 | Garth et al. | 340—172.5 |
| 3,328,763 | 6/1967 | Rathbun et al. | 340—172.5 |
| 3,341,819 | 9/1967 | Emerson | 340—172.5 |
| 3,355,714 | 11/1967 | Culler | 340—172.5 |
| 3,382,487 | 5/1968 | Sharon et al. | 340—172.5 |

PAUL J. HENON, Primary Examiner

R. F. CHAPURAN, Assistant Examiner